United States Patent
Schmitt-Landsiedel et al.

(10) Patent No.: US 6,323,728 B1
(45) Date of Patent: Nov. 27, 2001

(54) DATA CARRIER FOR THE CONTACTLESS RECEPTION OF AMPLITUDE-MODULATED SIGNALS

(75) Inventors: Doris Schmitt-Landsiedel, Ottobrunn; Gerhard Schraud, Mering; Robert Reiner, Neubiberg; Volker Güngerich, München, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/655,285

(22) Filed: Sep. 5, 2000

Related U.S. Application Data

(63) Continuation of application No. PCT/EP99/01378, filed on Mar. 3, 1999.

(30) Foreign Application Priority Data

Mar. 3, 1998 (EP) .................................. 98103736

(51) Int. Cl.⁷ ............................. H03D 1/00; H04L 27/06; G06K 19/07
(52) U.S. Cl. ............................. 329/347; 375/320
(58) Field of Search ................... 329/311, 347, 329/349, 350, 369; 375/295, 296, 300, 316, 320, 353

(56) References Cited

U.S. PATENT DOCUMENTS

| | | | |
|---|---|---|---|
| 5,495,241 | * 2/1996 | Donig et al. | 340/870.39 |
| 5,630,836 | * 5/1997 | Prem et al. | 607/61 |
| 6,134,275 | * 10/2000 | Reiner | 375/300 |
| 6,173,899 | * 1/2001 | Rozin | 235/492 |

FOREIGN PATENT DOCUMENTS

| | | |
|---|---|---|
| 0 525 642 A2 | 7/1992 | (EP) . |
| 2 751 148 | 1/1998 | (FR) . |

* cited by examiner

*Primary Examiner*—David Mis
(74) *Attorney, Agent, or Firm*—Herbert L. Lerner; Laurence A. Greenberg; Werner H. Stemer

(57) ABSTRACT

A data carrier includes at least one coil for the contactless reception of amplitude-modulated signals. A rectifier circuit is connected downstream of the coil. A circuit configuration processes and/or stores data. A supply-voltage control circuit is connected in parallel with the circuit configuration. A current measuring device acts as an amplitude demodulator and is disposed between the coil and the voltage-supply control circuit.

12 Claims, 4 Drawing Sheets

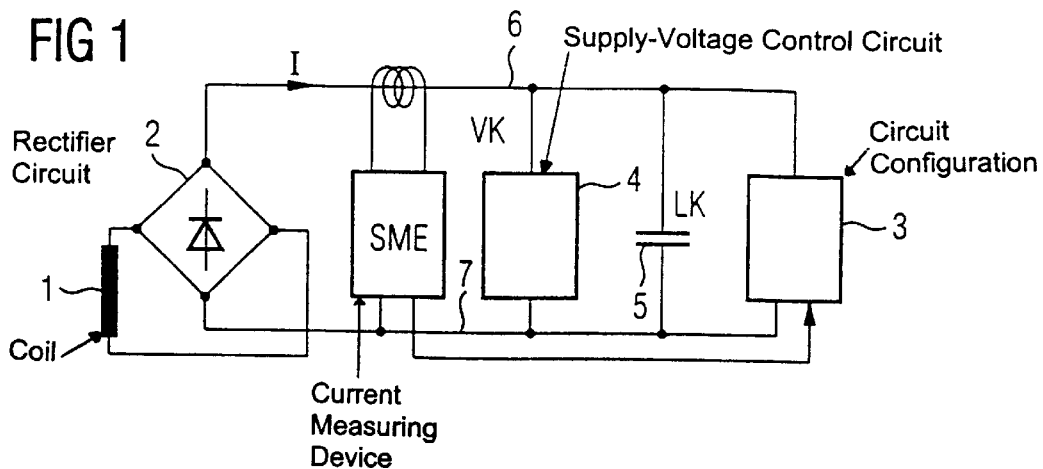
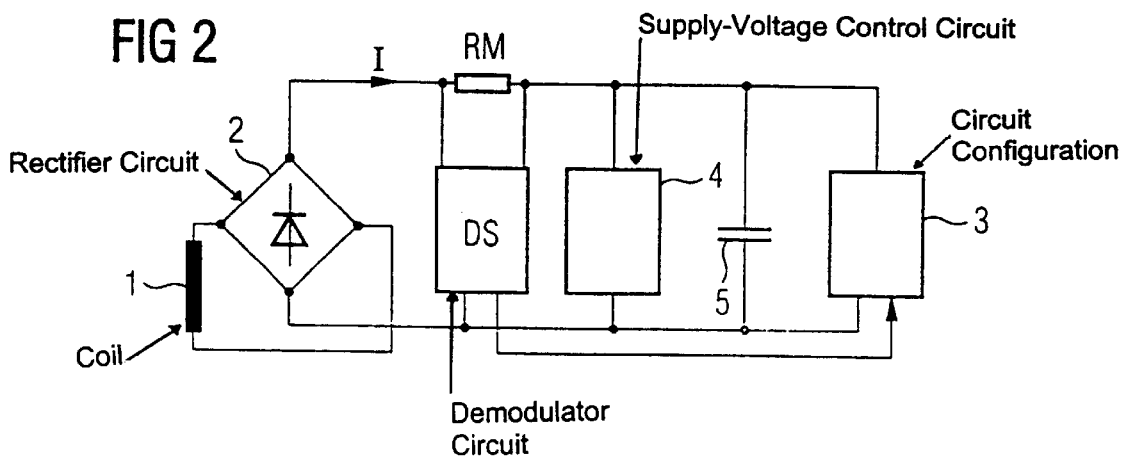
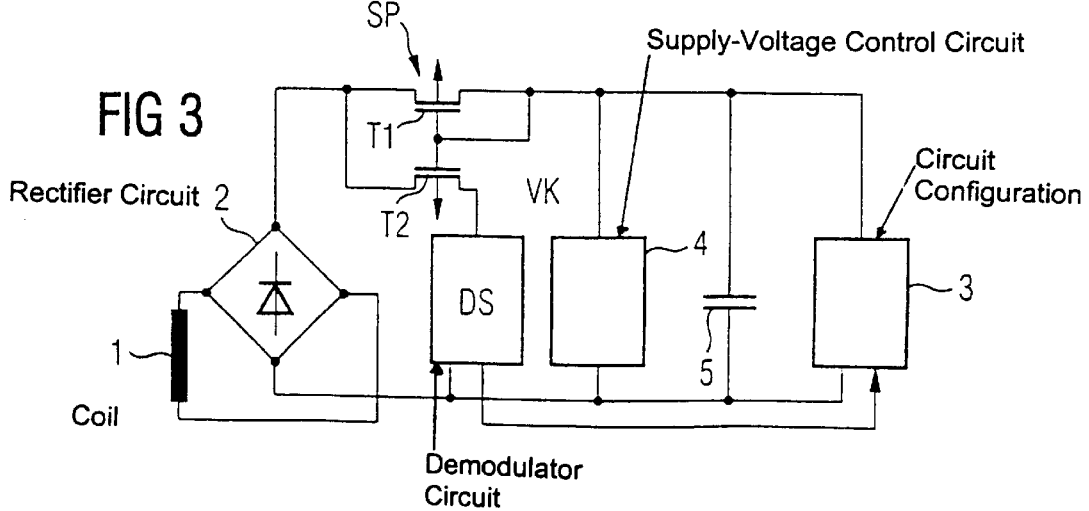

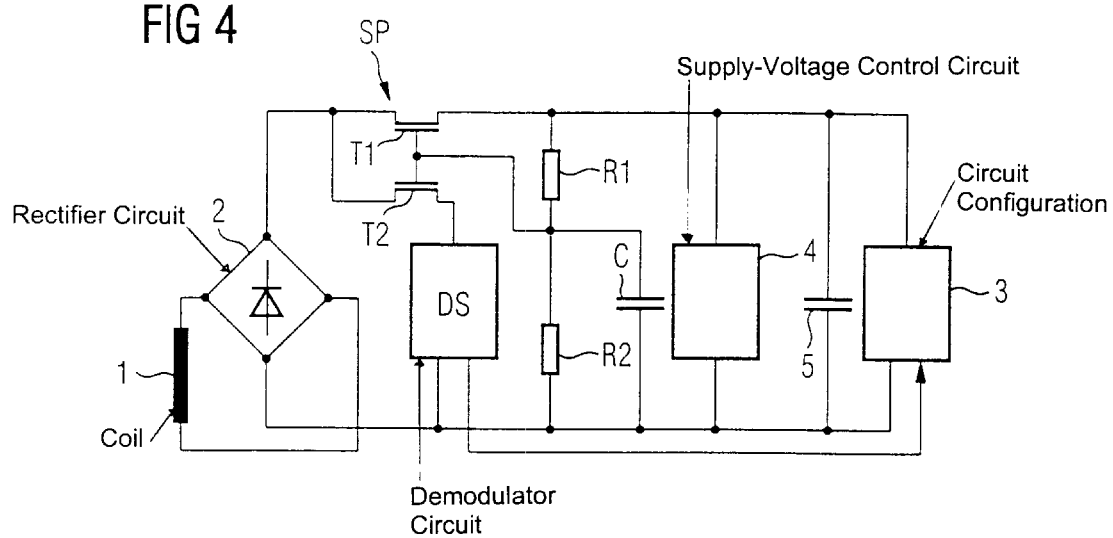
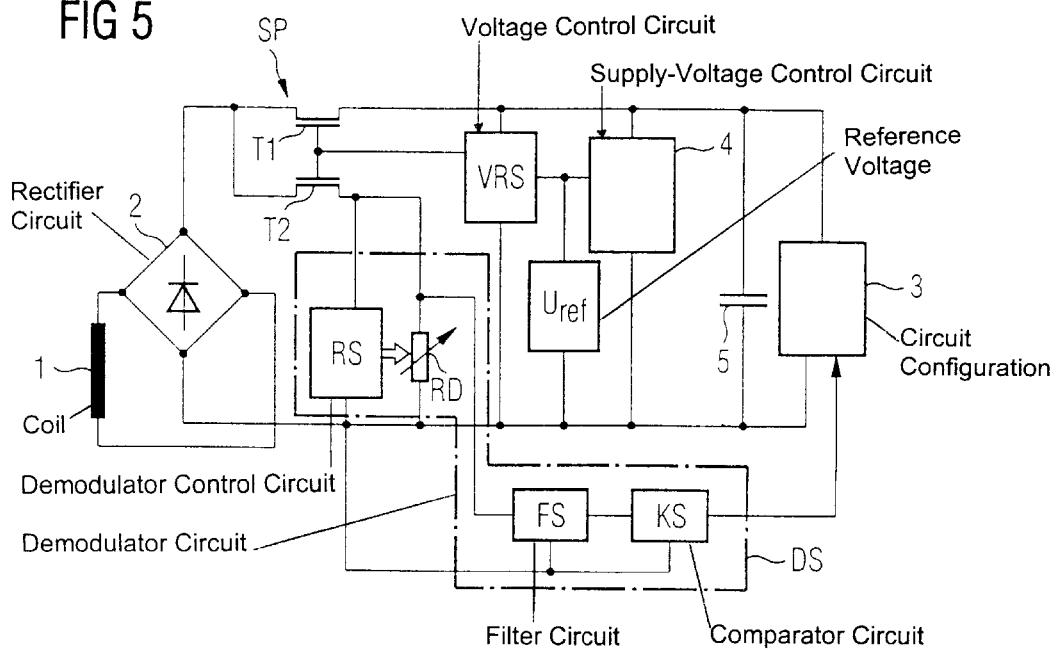

DATA CARRIER FOR THE CONTACTLESS RECEPTION OF AMPLITUDE-MODULATED SIGNALS

CROSS-REFERENCE TO RELATED APPLICATION

This application is a continuation of copending International Application No. PCT/EP99/01378, filed Mar. 3, 1999, which designated the United States.

BACKGROUND OF THE INVENTION

Field of the Invention:

The invention relates to a data carrier with at least one coil for the contactless reception of amplitude-modulated signals, a rectifier circuit connected downstream of the coil and a circuit configuration for processing and/or storing data.

Such a data carrier is presently on the market mainly in the form of a chip card and is known from German Published, Non-Prosecuted Patent Application DE 196 34 134 A1, corresponding to U.S. application Ser. No. 09/256,283, filed Feb. 23, 1999. In the case of the method described therein for transmitting data between a terminal and a portable data carrier through a wireless electromagnetic transmission link, a 100% ASK modulation of the carrier signal takes place, as is generally customary in the case of such present-day contactless transmissions. Although that switching on/off of the carrier signal is relatively easy to demodulate in the data carrier, it has the disadvantage that no clock signal is available during a blanking interval.

However, in standardizing bodies for a contactless chip card (ISO 14443), the current standpoint is to use not only ON-OFF keying (OOK) but also amplitude-shift keying (ASK) with a degree of modulation of 5 to 15% for the data transmission from a writing/reading device to a card or generally to a data carrier.

However, such modulation is difficult to demodulate since the distance between the writing/reading device and the data carrier can change greatly and, as a result, the amplitude of the received signal is subject to fluctuations which are superposed on the modulation and falsify it. In addition, the circuits in the data carrier have a greatly fluctuating power consumption, which likewise has retroactive effects on the modulation.

The problems referred to are particularly critical in the case of passive data carriers, which have no power supply of their own and obtain their operating energy from the signal being received.

SUMMARY OF THE INVENTION

It is accordingly an object of the invention to provide a data carrier for the contactless reception of amplitude-modulated signals, which reduces or even eliminates the hereinafore-mentioned disadvantages of the heretofore-known devices of this general type.

With the foregoing and other objects in view there is provided, in accordance with the invention, a data carrier, comprising at least one coil for contactless reception of amplitude-modulated signals; a rectifier circuit connected downstream of the at least one coil; a circuit configuration for processing and/or storing data; a supply-voltage control circuit connected in parallel with the circuit configuration; and a current measuring device acting as an amplitude demodulator, the current measuring device connected between the at least one coil and the voltage-supply control circuit.

In the case of the data carrier according to the invention, the demodulator is realized in conjunction with the power supply concept. As a first measure, the circuit configuration has a supply-voltage control circuit connected in parallel therewith. This brings about a decoupling of the currents in the load circuit provided by the circuit configuration and in the supply circuit provided by the coil and the rectifier. Consequently, the current in the supply circuit is only dependent on the power offered by the signal received by the coil. The amplitude modulation is registered with a current measuring device, acting as an amplitude demodulator, for the current in the supply circuit.

In accordance with a first embodiment of the invention, a measuring resistor having terminals connected to a demodulator circuit is disposed in the supply circuit. The demodulator circuit consequently evaluates the voltage drop across the measuring resistor, which is a measure of the amplitude modulation.

In accordance with a second embodiment of the invention, there is provided a current mirror circuit, the output current of which is equal or at least proportional to the current in the supply circuit and consequently to the modulation. The current mirror circuit has the advantage of ensuring that the voltage drop across the diode or the diode transistor in the supply circuit depends on the current in a non-linear relationship and, in the case of great currents, increases only with the root of the current and consequently limits the voltage at the rectifier. It is desirable to reduce the resistance value further in spite of the lower resistance of the current mirror diode in comparison with a measuring resistor. Therefore, in accordance with another feature of the invention, a bias voltage is provided at the gate of the current-mirror diode transistor, whereby the latter becomes more conductive. The bias voltage is advantageously chosen in such a way that the current-mirror diode transistor is still just in saturation.

In accordance with a first embodiment of a bias-voltage generating circuit, there is provided a voltage divider which is connected to the supply voltage, advantageously to the controlled supply voltage.

In accordance with a further feature of the invention, the voltage divider can be constructed as a filter, in order to suppress voltage fluctuations which are caused at the parallel run controller by a changing load.

In accordance with an added feature of the invention, there is provided a further voltage controlling circuit. This circuit may be connected to the supply-voltage controlling circuit in an advantageous way. In other words, it may be supplied with power by the latter, in order to supply a more stable output voltage in this way.

In accordance with a third embodiment of the invention, the current mirror circuit is integrated into the rectifier circuit. As a result, no further voltage drops between the rectifier circuit and the load, since the current mirror circuit shares the use of a diode already contained in the rectifier circuit. In an advantageous way, two current mirror circuits are used, since then the pulse frequency of the input current of the demodulator circuit to be connected downstream of a current mirror circuit is twice as high, so that the filtering in the demodulator circuit is made easier.

In accordance with a further feature of the invention, the voltage drop may also be detected and evaluated at rectifier diodes themselves. For this purpose, at least one further pair of diodes is connected in an advantageous way in parallel with a pair of diodes of the rectifier circuit leading to a supply line. The connecting point of the diodes, disposed with opposite polarity, of this further pair of diodes, is connected to a first input of a demodulator circuit. The supply voltage delivered by the corresponding pair of diodes of the rectifier circuit is fed to a second input of the demodulator circuit, so that the demodulator circuit can evaluate the differential voltage. The diodes represent a non-linear resistance, the characteristic of which must be taken into consideration in the demodulation. This variant of the invention has one advantage which is that no additional voltage drop occurs and another advantage which is that the extension of the rectifier circuit can be carried out very simply in practice.

In accordance with an a concomitant feature of the invention, a combination of the supply voltage control in the load circuit with the current measurement in the supply circuit, is achieved by providing a series control circuit, in which the voltage is controlled at the output of the rectifier circuit. A transistor disposed in the current path between the rectifier circuit and the supply-voltage control circuit is driven in such a way that its resistance changes according to the current in the supply circuit so that the voltage drop across the transistor remains virtually constant. The control signal for the transistor is then a measure of the current in the supply circuit and consequently of the modulation.

Other features which are considered as characteristic for the invention are set forth in the appended claims.

Although the invention is illustrated and described herein as embodied in a data carrier for the contactless reception of amplitude-modulated signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic and block circuit diagram of a basic representation of a data carrier according to the invention;

FIG. 2 is a schematic and block circuit diagram of a basic representation of a first exemplary embodiment;

FIG. 3 is a schematic and block circuit diagram of a basic representation of a second exemplary embodiment of the invention;

FIG. 4 is a schematic and block circuit diagram of a development of the exemplary embodiment according to FIG. 3;

FIG. 5 is a schematic and block circuit diagram of a further development of the embodiment according to FIG. 3;

DESCRIPTION OF THE PREFERRED EMBODIMENT

Figure 6:
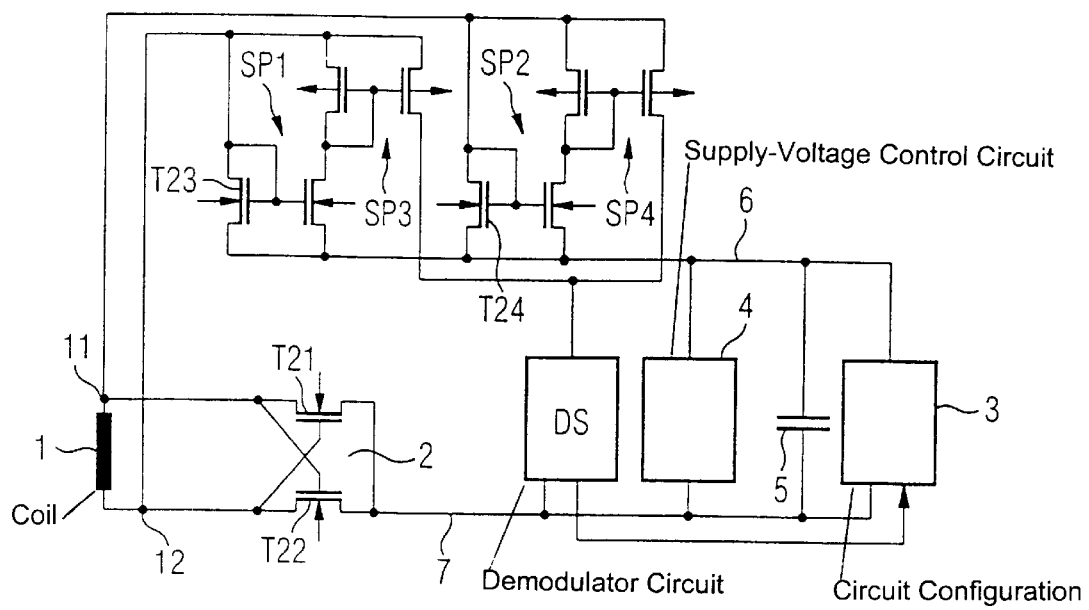
FIG. 6 is a schematic and block circuit diagram of a basic representation of a third embodiment of the invention.

Referring now to the figures of the drawings in detail and first, particularly, to FIG. 1 thereof, there is seen a coil 1 connected to a rectifier circuit 2 which, for its part, supplies a supply voltage through lines 6, 7 to a circuit configuration 3 for processing and/or storing data.

On one hand, the data carrier represented in principle in FIG. 1 is intended to be able to receive energy and data from a writing/reading device through the coil 1. In this case, a carrier signal sent from the writing/reading device is amplitude-modulated. On the other hand, it is also possible to send data from the data carrier to the writing/reading device. FOR that purpose, a loading modulation is carried out at the coil 1 as an example and as is customary at present. Since details regarding this transmission are of no significance for the present invention, the circuit parts necessary therefor are not represented in the figures and are also not discussed any further below.

The circuit configuration 3 for processing and storing data primarily has a preferably non-volatile data memory. However, it also includes logic circuits for processing and editing the data, in particular in order to carry out the intended task as a response to the data received. In a particularly highly developed embodiment of such a data carrier, the circuit configuration 3 includes a complete microcomputer.

On one hand, the circuit configuration 3 described herein requires as constant a supply voltage as possible, but will have a fluctuating power or current consumption, depending on the task to be achieved. Although the writing/reading device will send a signal with a constant signal output to the data carrier, the signal received there will have a fluctuating amplitude, depending on the distance of the data carrier from the writing/reading device. These two effects are superposed on the amplitude modulation of the carrier signal and can consequently falsify the data to be received.

The problem of the demodulation of the amplitude-modulated signal is solved in a manner corresponding to the invention, in conjunction with the power supply concept, in particular the supply voltage stabilization.

As a first measure, a supply-voltage control circuit 4 is connected in parallel with the circuit configuration 3. This parallel run controller 4 carries away a higher current which is delivered by the coil 1 and the rectifier circuit 2 in the case of full amplitude, that is to say, for example, when sending a logical "1". The voltage at the circuit configuration 3 remains unaffected thereby. The supply-voltage control circuit 4 consequently carries out a decoupling of a load circuit LK, defined by the supply-voltage control circuit 4 and the circuit configuration 3, and of a supply circuit VK, defined by the coil 1 and the rectifier circuit 2 as well as the supply-voltage control circuit 4. A current I through the supply circuit VK in this case is a measure of the amplitude modulation. A charging capacitor 5 which is connected in parallel with the supply-voltage control circuit 4 serves as an energy storage device for the circuit configuration 3.

All of the previously mentioned circuit parts can be realized as an integrated circuit on a semiconductor chip. It is possible in this case to lead the connecting points of the charging capacitor 5 to the outside with the supply lines 6, 7, so that an external capacitor can be connected to the semiconductor chip for increasing a charging capacity.

As a second measure according to the invention, the current I is detected by a current measuring device SME, acting as an amplitude demodulator. The detected signal is demodulated and the data signal obtained in this way is delivered to the circuit configuration 3.

FIG. 2 shows a first possibility of a current measuring device, in which a measuring resistor RM is disposed in the current path of the supply circuit VK and has terminals that are connected to a demodulator circuit DS. A voltage drop across the measuring resistor RM is a measure of the current I through the supply circuit VK and consequently a measure of the modulation of the carrier signal.

Although the measuring resistor RM is simple to realize, the voltage drop caused by it is disruptive, since it restricts the range of the data carrier. In another embodiment of the invention shown in FIG. 3, the current measuring device is realized by a current mirror SP. The current mirror circuit SP has a transistor T1 which is connected as a diode and is disposed in the current path of the supply circuit VK. A transistor T2 has a drain terminal at which it delivers the current to be demodulated, which is proportional to the current in the supply circuit VK, to the demodulator circuit DS. Such a current mirror circuit SP has the advantage of ensuring that the voltage drop across the transistor diode T1 is small and this transistor T1 is non-reactive, since it operates in saturation.

A further reduction in the voltage drop in the supply circuit VK is achieved according to FIGS. 4 and 5 by the application of a bias voltage to the gate of the current mirror transistor T1 disposed in the supply circuit VK. A bias-voltage generating circuit can be realized with a voltage divider formed of resistors R1, R2. In an advantageous development, the bias-voltage generating circuit is supplemented by a capacitor C to form a filter, in order to suppress voltage fluctuations at the parallel run controller 4 due to load fluctuations.

According to FIG. 5, the bias-voltage generating circuit may also be formed with a further voltage control circuit VRS for further stabilization of the bias voltage. This may have the same reference voltage $U_{ref}$ applied to it as the supply-voltage control circuit 4. The reference voltage $U_{ref}$ is derived from the controlled supply voltage.

One possible embodiment of a demodulator circuit DS is presented in somewhat more detail in FIG. 5. The current from the current mirror transistor T2 is passed through a controllable resistor RD. The voltage drop across this resistor RD is fed to a filter circuit FS for filtering out the direct component and, thereafter, to a comparator circuit KS, which detects the logic levels. A demodulator control circuit RS controls the resistor RD in such a way that, when there are slow current fluctuations as are caused, for example, by a mechanical movement of the data carrier in an electromagnetic field of a writing/reading device, a constant voltage drop is obtained. The demodulator control circuit RS in this case is connected in parallel with the resistor RD, which may be formed by an MOS transistor operating in the resistance range.

The rectifier circuit 2 is formed by diodes. In integrated semiconductor circuits, these diodes are usually formed by transistors T21, ... T24 connected as diodes. In order to avoid a further voltage drop in the supply circuit VK, these transistor diodes may be supplemented to form current mirrors and the mirror current fed to a demodulator circuit. In FIG. 6, transistor diodes T23, T24 of the rectifier circuit 2 leading to the positive supply voltage line 6 have been supplemented to form current mirrors SP1, SP2. In each case, a further current mirror SP3, SP4 is connected downstream of the current mirrors SP1, SP2 for reversing the direction. In the example presented, the current mirror circuits SP1, SP2 lying in the rectifier circuit 2 are formed by n-channel MOS transistors and the downstream current mirror circuits SP3, SP4 are formed by p-channel MOS transistors.

Figure 7:
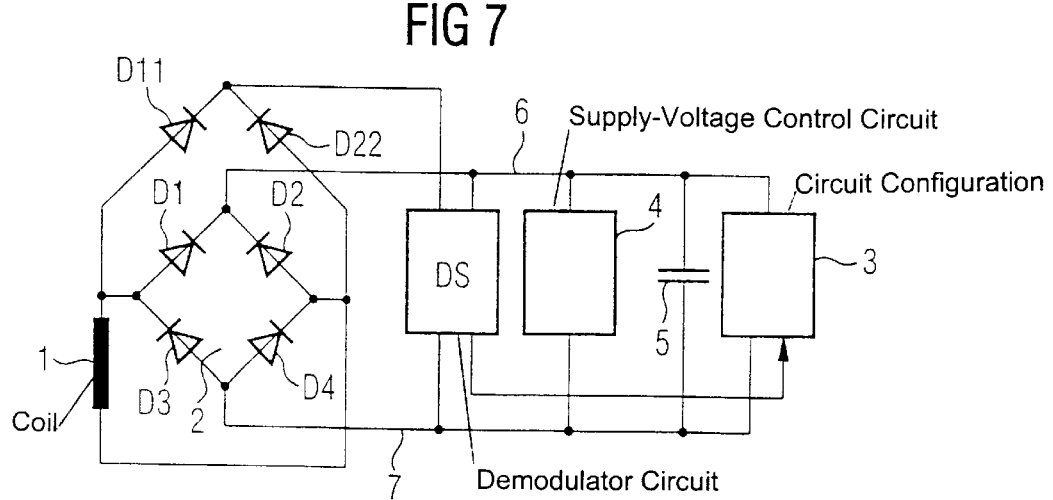
FIG. 7 is a schematic and block circuit diagram of a basic representation of a fourth embodiment of the invention.

In the case of the embodiment of the invention according to FIG. 7, diodes D1 ... D4 of the rectifier 2 are used as resistors, and the voltage drop across them is fed to a demodulator circuit as information on the current intensity. The advantageous structure of this embodiment shown in FIG. 7 also includes a rectifier reference branch with further diodes D11, D22. The further diodes D11, D22 are connected in parallel with the diodes D1, D2 leading to the positive supply voltage line 6. However, their connecting point is connected to the demodulator circuit DS, so that the latter can evaluate the differential voltage.

Figure 8:
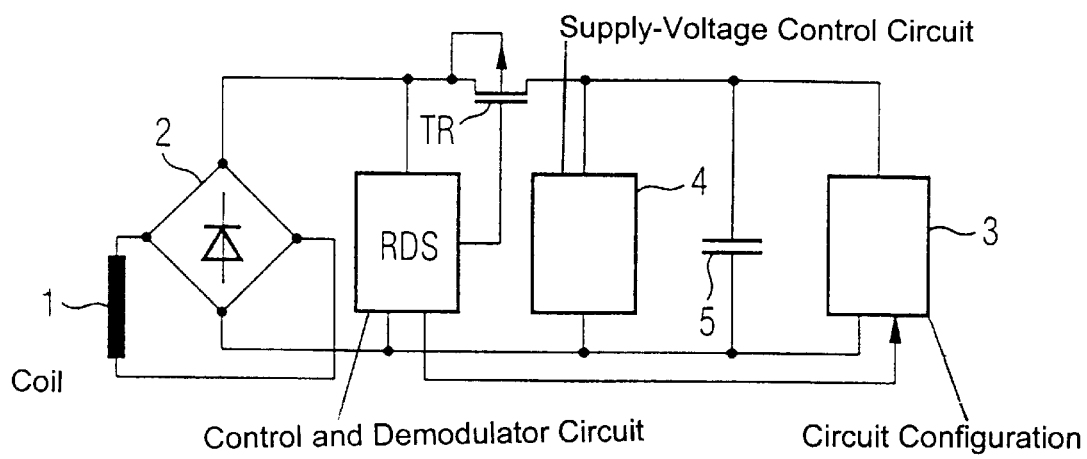
FIG. 8 is a schematic and block circuit diagram of a basic representation of a fifth embodiment of the invention.

A further possibility for the detection of the current flowing in the supply circuit VK is shown in FIG. 8. According to this embodiment, a control transistor TR which is disposed in the supply circuit VK is driven by a control and demodulator circuit RDS. The control and demodulator circuit RDS is directly connected to the output terminals of the rectifier circuit 2, so that the input voltage is kept constant by a series controller formed by the control transistor TR and the control and demodulator circuit RDS.

This takes place by driving the control transistor TR in such a way that its volume resistance is changed according to the current in such a way that the voltage drop across the control transistor TR remains constant. The control signal for the control transistor TR is then a measure of the current in the supply circuit VK and can be correspondingly evaluated.

Figure 9:
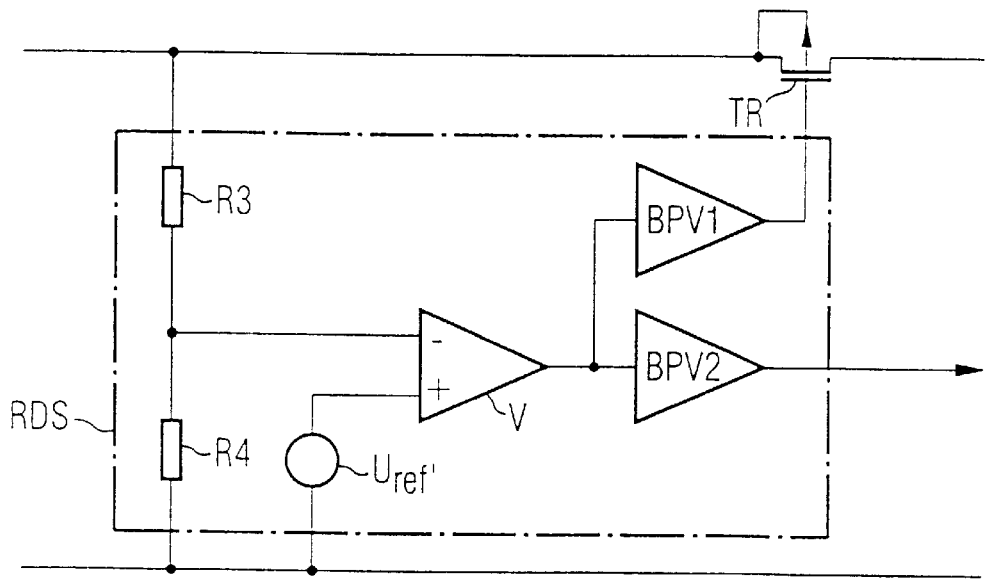
FIG. 9 is a schematic and block circuit diagram of a more detailed representation of the control and demodulator circuit according to FIG. 8.

FIG. 9 shows a possible circuit provided for this purpose. An input voltage derived from a voltage divider having resistors R3, R4, which are connected to the output terminals of the rectifier circuit 2, is compared through the use of a comparator V with a reference voltage $U_{ref}$. A differential signal is fed through a first bandpass amplifier BPV1 to the gate of the control transistor TR. The output signal of the comparator V is also passed through a second bandpass amplifier BPV2, having an output which provides the signal corresponding to the modulation. In principle, it is also possible to dispense with the bandpass amplifiers BPV1, BPV2 if the comparator V itself has a suitable filter characteristic and the input of the circuit configuration 3 to which the demodulated signal is fed is non-reactive, so that the control of the control transistor TR is not influenced.

Voltage limiting circuits may also be provided on the semiconductor chip to protect the integrated circuits in contactless operation. For instance, both an AC voltage limiting circuit may be disposed upstream of the rectifier and a DC voltage limiting circuit may be disposed downstream of the rectifier.

The data carrier according to the invention has so far been presented as operating in a purely contactless manner. It is, however, also readily possible to construct it as a combined data carrier or dual-interface data carrier. In other words, it is possible to also provide contact areas to allow operation with contacts, in addition to the receiving and transmitting coil 1. In operation with contacts, it may be necessary to switch off the parallel run controller 4, in order to ensure that an excessive shunt current does not flow if a higher voltage than the parallel run controller would like to set is delivered by the contacts. A further circuit which detects whether the data carrier is operating in contactless operation or operation with contacts is then necessary for the corresponding driving of the parallel run controller 4. For example, such a circuit can then detect and evaluate the presence of a supply voltage at the contacts and/or at the rectifier circuit connected downstream of the coil and/or the presence of a high-frequency carrier signal at the coil and/or the presence of a clock signal at the contacts.

We claim:

1. A data carrier, comprising:
   at least one coil for contactless reception of amplitude-modulated signals;
   a rectifier circuit connected downstream of said at least one coil;
   a circuit configuration for at least one of processing and storing data;
   a supply-voltage control circuit connected in parallel with said circuit configuration; and
   a current measuring device acting as an amplitude demodulator, said current measuring device connected between said at least one coil and said voltage-supply control circuit.

2. The data carrier according to claim 1, wherein said current measuring device is formed by a resistor.

3. The data carrier according to claim 1, wherein said rectifier circuit and said supply-voltage control circuit define a current path therebetween, and said current measuring device is formed by a current mirror circuit disposed in said current path.

4. The data carrier according to claim 3, including a bias-voltage generating circuit having an output, said current mirror circuit having a diode transistor with a control terminal connected to said output.

5. The data carrier according to claim 4, wherein said bias-voltage generating circuit is formed by a voltage divider.

6. The data carrier according to claim 4, wherein said bias-voltage generating circuit is a low-pass filter.

7. The data carrier according to claim 4, wherein said bias-voltage generating circuit is formed by a further voltage control circuit.

8. The data carrier according to claim 1, wherein said current measuring device is formed by at least one current mirror circuit having at least one diode transistor also acting as at least one diode transistor of said rectifier circuit.

9. The data carrier according to claim 1, including a supply line, said rectifier circuit having a pair of diodes leading to said supply line, said current measuring device formed by at least one further pair of diodes poled in the same way as, and connected in parallel with, said pair of diodes of said rectifier circuit, said at least one further pair of diodes having interconnected terminals forming an output of said current measuring device.

10. The data carrier according to claim 1, wherein said rectifier circuit and said supply-voltage control circuit define a current path therebetween, said current measuring device is formed by an input-voltage control circuit disposed in said current path and constructed as a series controller, and said series controller has a control transistor receiving an adjusting signal, the adjusting signal being proportional to a current to be measured and being evaluated.

11. The data carrier according to claim 1, wherein said current measuring device is formed by a demodulator circuit.

12. The data carrier according to claim 11, wherein said demodulator circuit is formed by a controllable resistor converting a current into a voltage, and a demodulator control circuit driving said resistor.

* * * * *